Oct. 9, 1956 A. MAMO 2,765,941
BREAK FRAME BOAT TRAILER
Filed July 31, 1953 2 Sheets-Sheet 2
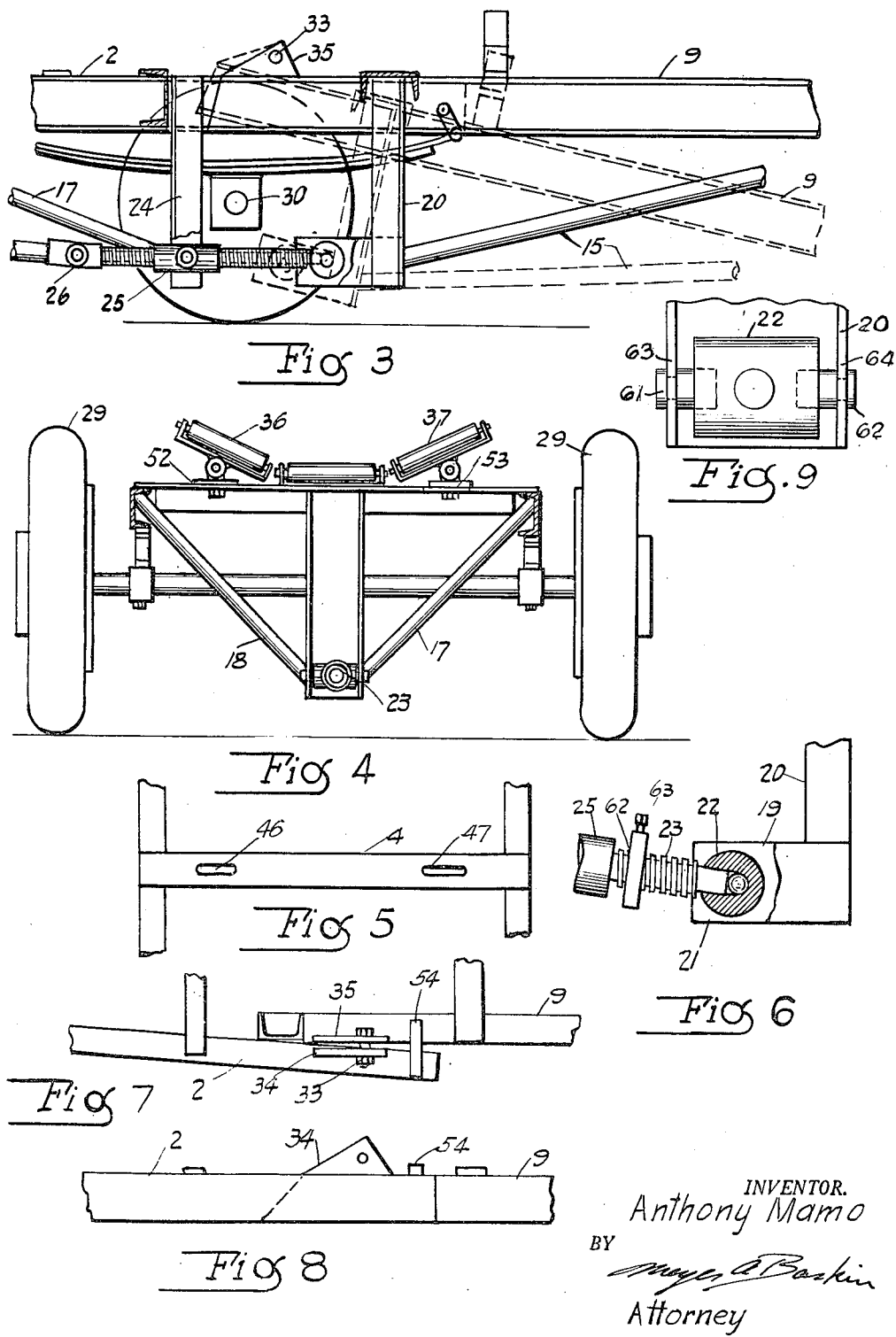

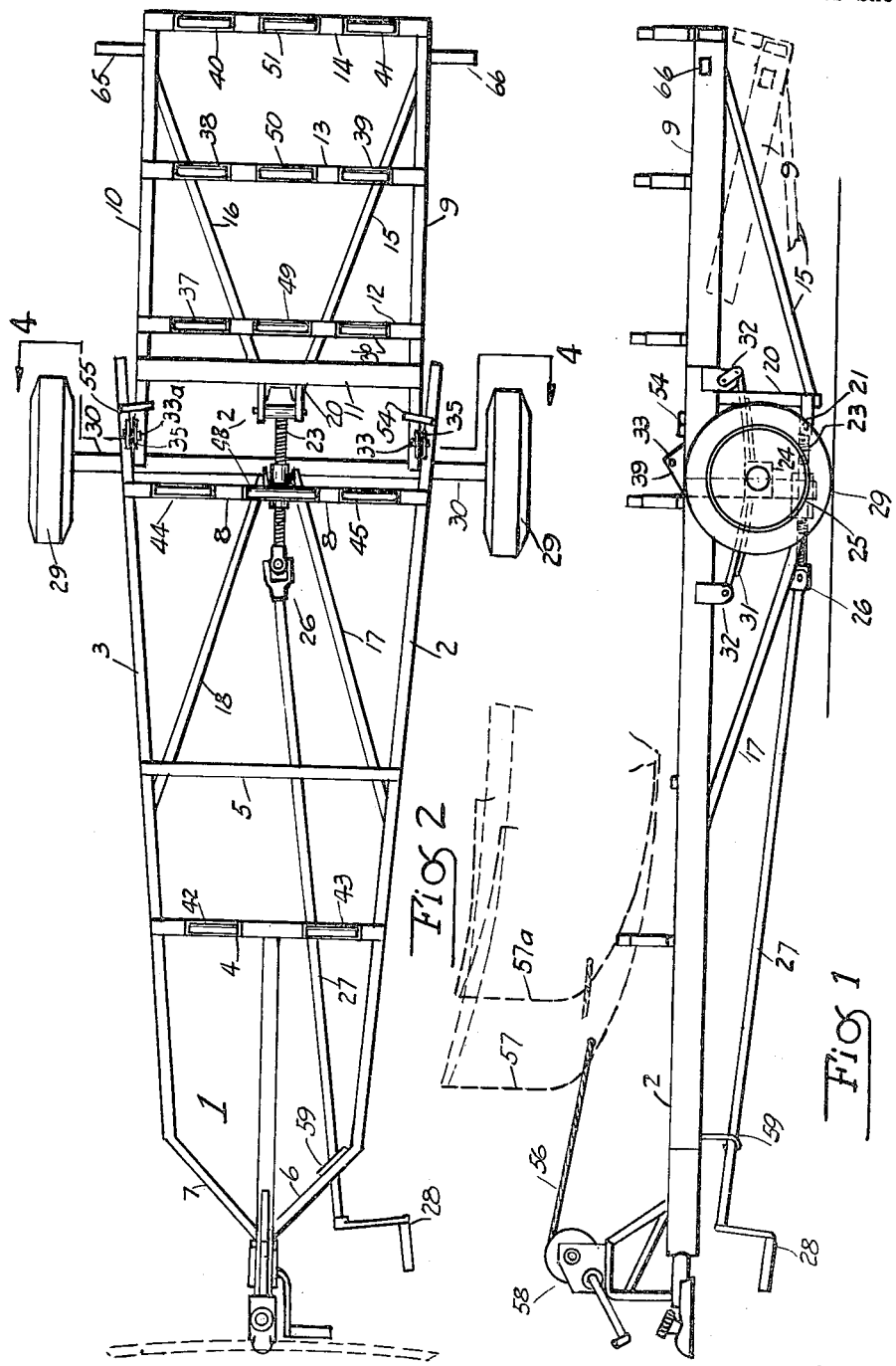

United States Patent Office 2,765,941
Patented Oct. 9, 1956

2,765,941

BREAK FRAME BOAT TRAILER

Anthony Mamo, Miami, Fla.

Application July 31, 1953, Serial No. 371,507

5 Claims. (Cl. 214—506)

This invention relates to a trailer and particularly to an improvement in a boat hauling, launching and loading trailer.

One of the objects of the present invention is to provide an improved boat hauling, launching and loading trailer which can be readily operated by one person.

Another object of the present invention is to provide a boat trailer that can be used to launch and to load boats without getting the mechanism of the trailer and particularly without getting the wheel, axles and bearings in the water.

Another object of the present invention is to provide a boat launching and loading trailer which can be used without detaching the trailer from the vehicle to which it is attached for hauling and without getting the said vehicle wet. An additional object of the present invention is to provide a launching, loading and carrying boat trailer which can be readily adapted to fit different sizes and shapes of boats.

My invention consists essentially of an over-lapping break frame trailer. It is called over-lapping because the frame itself consists of two frames which are partly one inside of the other and it is called a break frame because the frame is hinged at approximately the middle to allow the rear end of the trailer to be lowered.

Essentially my over-lapping break frame trailer consists of two standard type ground engaging wheels with an axle between them for the major support of the weight, a frame of strong weight supporting members, the forward half of which is stationary, the rear half of said frame being arranged to be lowered so that its end rests on the ground, the forward end of the said rear half of the frame being overlapped by the rear portion of the forward half of the said frame.

Rubber rollers are suitably arranged along the frame so as to distribute and bear the weight of the boat. Each roller can be adjusted both horizontally and vertically to accommodate any type of boat.

By using the overlapping break frame of my invention the trailer can remain attached to the vehicle while it is being loaded and unloaded and at the same time the vehicle does not get wet nor does the mechanism of the break frame trailer get wet under normal conditions.

The loading and unloading operations are controlled by a winch at the forward end of the trailer. The raising and lowering of the rear end of the break frame is controlled by a crank also at the forward end of the trailer.

By use of my break frame trailer the popular type of outboard cruisers now on the market can be launched in the water and loaded on to the trailer from the water entirely without the use of a boat lift. This is an important advantage since boat lifts which are stationary derricks are usually only available at a limited number of locations at some expense to the boat owner.

The other advantages and objects of the present invention will be more fully apparent from the following description and claims and the accompanying drawing, reference to which is made herein.

In the said drawing:

Figure 1 is a side elevation view of the boat hauling, launching and loading trailer, showing a boat in two positions on the trailer.

Figure 2 is a top plan view of the trailer with the boat removed.

Figure 3 is a side elevational view of a portion of the trailer showing details of the mechanism with the rear end of the break frame in two different positions.

Figure 4 is an end elevational view taken along the line 4—4 of Figure 2.

Figure 5 is a top plan view of one of the cross members of the break frame.

Figure 6 is a detailed and partial cross section view showing the mechanism of raising and lowering the rear of the break frame.

Figure 7 is a top plan view showing the detailed construction of the hinge in the break frame.

Figure 8 is a side elevation of the same hinge shown in Figure 7.

Figure 9 is a detail of a bearing supporting means.

In the drawing the forward end of the break frame indicated generally by 1 consists essentially of two spaced apart side members 2 and 3 held in fixed space relationship by cross members 4 and 5 and 8 and joined at their forward end by angular members 6 and 7. Said side members 2 and 3 being set at a divergent angle to one another so that they are farther apart at the rear than they are at the forward end.

In all cases the forward end is considered to be the end toward the vehicle which is pulling the trailer and the rear is considered to be the opposite or boat launching end.

The side members as well as the cross members are preferably made of channel shaped steel bars but any suitable material of proper strength could be used, such as I beams or steel tubes.

The rear portion of the break frame trailer consists of side members 9 and 10 which are held in parallel spaced relationship to each other by cross members 11, 12, 13 and 14.

The side members 9 and 10 are supported from below by angular supporting members 15 and 16 whereas side members 2 and 3 on the forward end of the frame are supported by angular supporting members 17 and 18. The angular supporting members 15, 16, 17 and 18 must be of particularly strong and rigid construction and are preferably of tubular shape as shown. The angular supporting members 15 and 16 converge on a socket supporting member 19 which is rigidly attached to a vertical supporting member 20. A socket 21 is built into the socket supporting member 19 and contains a hard steel ball 22. Bearing against this steel ball is the end of a hard steel threaded shaft 23.

Threaded steel shaft 23 is further supported by a vertical member 24 having an internally threaded bearing 25. The threaded steel shaft 23 terminates in a universal joint 26 which is connected by shaft 27 to crank 28.

Ground engaging wheels 29 are of standard type and are connected by axle 30 on which is mounted springs 31 which are attached by standard type shackles 32 to side members 2 and 3.

The connection between the side members 9 and 10 of the rear part of the break frame and forward members 2 and 3 of the forward part of the break frame is by means of hinges 33 and 33a. The said hinges are mounted above the frames by means of triangular shaped steel members 34 and 35 which are welded to members 2 and 9 respectively. Corresponding members on the other side are welded to members 3 and 10 respectively.

The side rollers 36, 37, 38, 39, 40, 41, 42, 43, 44 and 45 all may be adjusted both horizontally and vertically to conform to any size or shape of boat. This is accomplished by means of slots 46 and 47 and similar slots in each of the cross members on which the said rollers are mounted. The center rollers 48, 49, 50 and 51 are generally made stationary, that is not adjustable, since they normally would bear the weight of the keel which is generally speaking on a straight line.

The side rollers 36, 37, 38, 39, 40, 41, 42, 43, 44 and 45 can also be adjusted vertically by putting additional pieces of steel or shims under them by removing and replacing the bolts by which they are attached. They are shown in Figure 4 with a single piece of steel shim 52 and 53 under them. Either more or less shims can be used, although shown in connection with side rollers 36 and 37, the same principle is applicable to all the side rollers.

Stationary steel stop members 54 and 55 are provided attached to the rear end of side members 2 and 3 to prevent the rear half of the frame from raising up too high.

A stop ring 62 is provided on the steel shaft 23 which is held in place by set screw 63. The purpose of this stop ring 62 is to prevent the shaft from being unscrewed too far so as to lose contact with socket 21. This could occur if the trailer were not on level ground so that the rear part of the frame would go down too far. Another and preferred form of mounting the bearing 22 of the raising mechanism is shown in Figure 9 where a floating pin or cylindrical bearing housing 60 is mounted on pins 61 and 62. Channels 63 and 64 in said pins hold the pins in position in holes in the side of channel member 20. This permits a turning movement by housing 60 about the longitudinal axis of pins 61 and 62. This turning movement is important to prevent binding, and resultant difficulty in turning crank 28 when lowering and raising the rear half of trailer. This is because the shaft 23 can remain in alignment with housing 60.

In operation if for example it is desired to load a boat which is already in the water the trailer is backed by means of the vehicle to which it is attached down to the water's edge so that the ground engaging wheels 29 are just barely touching the edge of the water. By operating the crank 28 then by means of universal joint 26 and steel shaft 23 the rear half of the break frame is lowered until its end 14 rests in the water. The rope 56 is then attached to the bow of the boat 57 and by operating the winch 58 the boat is hauled up on the trailer as far forward as possible so that its weight rests principally on the forward half 1 of the break frame.

By again operating crank 28 the rear end of the break frame is raised until the side rollers 36, 37, 38, 39, 40 and 41 which are on the rear half of the break frame contact the hull of the boat. The winch 58 is then slightly released to allow the boat 57 to roll back until its hull firmly contacts the rollers 36, 37, 38, 39, 40 and 41. The crank 28 is then placed on its supporting hooks 59 and the winch 58 operated to make the rope 56 tight and the trailer is ready to go.

By proper simple adjustment of the bolts holding the side rollers and the shims under the side rollers, the proper contact with the hull of any shaped boat can be accomplished. Once set for any particular boat hull it need not be changed.

It has been found that when the rear part of the trailer is raised by operating the crank 28 so that side members 9 and 10 contact stops 54 and 55, a man's weight jumping on the rear end of the break frame on cross member 14 will not release a piece of newspaper caught between side member 9 and stop 54. This illustrates the extreme rigidity and firmness of the break frame trailer.

In addition there are provided side members 65 and 66 which have perforations which can be used to hold the boat down by a rope or chain passing over the hull and turn buckle if desired.

In construction it is preferred to use a welded construction although bolts and rivets could also be used. Welded construction gives the great rigidity and strength that is needed for this type of trailer.

Other aspects of my invention will be apparent to those skilled in the art but my invention is to be limited solely by the following claims:

I claim:

1. In a boat launching, loading and carrying trailer, a break frame consisting essentially of a forward half and a rear half, said forward half consisting of side members rigidly and angularly spaced with respect to each other, cross bars connecting said side members, angular supporting members supporting said side members, said angular supporting members being rigidly attached to a vertical member which in turn is rigidly attached to a centrally located cross member, said forward half of said frame being on springs, axle and ground engaging wheels, said rear half of said frame consisting of two parallel rigidly spaced side members held in place by cross members, said rear side members being supported by rigid angular members attached to a socket supporting means, said socket supporting means being rigidly attached to a vertical member which in turn is rigidly attached to a cross member of said rear half of said trailer, said rear side members being substantially overlapped by the said forward side members and being attached thereto by hinges positioned above the said side memebrs, said rear portion of said trailer being operable to be lowered so that its rear end rests on the ground, side rollers and center rollers mounted on said foward half and said rear half to support a boat hull, said side rollers being adjustable both horizontally and vertically, said hinges being positioned to the rear of said axle.

2. In a boat launching, loading and carrying trailer, a break frame consisting essentially of a forward half and a rear half, said forward half consisting of side members rigidly and angularly spaced with respect to each other, cross bars connecting said side members, angular supporting members supporting said side members, said angular supporting members being rigidly attached to a vertical member which in turn is rigidly attached to a centrally located cross member, said forward half of said frame being supported on springs, axle and ground engaging wheels, said rear half of said frame consisting of two parallel rigidly spaced side members held in place by cross members, said rear side members being supported by rigid angular members attached to a socket supporting means, said socket supporting means being rotatably attached to a rigid vertical member that is rigidly attached to a cross member of rear half of said trailer, said rear side members being substantially overlapped by the said forward side members and being attached thereto by hinges positioned above the said side members, said rear portion of said trailer being operable to be lowered so that its rear end rests on the ground, side rollers and center rollers to support a boat hull, said side rollers being adjustable both horizontally and vertically, said hinges being positioned to the rear of said axle.

3. In a boat launching, loading and carrying trailer, as described in claim 2 a socket supporting means rotatably attached to a rigid vertical member, said socket supporting means consisting of a floating pin.

4. In a boat launching, loading and carrying trailer, a break frame consisting essentially of a forward half and a rear half, said forward half consisting of side members rigidly and angularly spaced with respect to each other, cross bars connecting said side members, angular supporting members supporting said side members, said angular supporting members being rigidly attached to a vertical member which in turn is rigidly attached to a centrally located cross member, said forward half of said frame being supported on springs, axle and ground engaging wheels, said rear half of said frame consisting of two parallel rigidly spaced side members held in place by cross members, said rear side members being supported by rigid angular members attached to a socket supporting means, said socket supporting means being rigidly attached to a vertical member which in turn is rigidly attached to a cross member of said rear half of said trailer, said rear side members being substantially overlapped by the said forward side members and being attached thereto by hinges positioned above the said side members, said rear portion of said trailer being operable to be lowered so that its rear end rests on the ground, adjustable supporting means for hull of said boat, said hinges being positioned to the rear of said axle.

5. In a boat launching, loading and carrying trailer, a break frame consisting essentially of a forward half and a rear half, said forward half consisting of side members rigidly and angularly spaced with respect to each other, cross bars connecting said side members, angular supporting members supporting said side members, said angular supporting members being rigidly attached to a vertical member which in turn is rigidly attached to a centrally located cross member, said forward half of said frame being supported on springs, axle and ground engaging wheels, said rear half of said frame consisting of two parallel rigidly spaced side members held in place by cross members, said rear side members being supported by rigid angular members attached to a socket supporting means, said socket supporting means being rotatably attached to a rigid vertical member that is rigidly attached to a cross member of rear half of said trailer, said socket containing a steel ball bearing supporting the pressure of the weight of said rear half of said trailer, said rear side members being substantially overlapped by the said forward side members and being attached thereto by hinges positioned above the said side members, said rear half of said trailer being operable to be lowered so that its rear end rests on the ground, when said forward half is in substantially horizontal position, adjustable supporting means for hull of said boat, said hinges being positioned to the rear of said axle.

References Cited in the file of this patent

UNITED STATES PATENTS

| | | |
|---|---|---|
| 1,862,682 | Judd | June 14, 1932 |
| 1,924,797 | Mitchell | Aug. 29, 1933 |
| 1,990,335 | Laffey et al. | Feb. 5, 1935 |
| 2,173,277 | Jarmin et al. | Sept. 19, 1939 |
| 2,332,991 | Commire | Oct. 26, 1943 |
| 2,485,793 | Vassar | Oct. 25, 1949 |
| 2,558,418 | Brueckman | June 26, 1951 |
| 2,608,314 | Krider | Aug. 26, 1952 |
| 2,650,730 | Rohm | Sept. 1, 1953 |
| 2,676,716 | Sallis | Apr. 27, 1954 |
| 2,684,021 | Ratzlaff | July 20, 1954 |

FOREIGN PATENTS

| | | |
|---|---|---|
| 130,125 | Germany | July 19, 1905 |